US012636709B2

(12) United States Patent
Hecht

(10) Patent No.: US 12,636,709 B2
(45) Date of Patent: May 26, 2026

(54) CUTTING TOOL AND INDEXABLE CUTTING INSERT HAVING A MOUNTING CUT-OUT THEREFOR

(71) Applicant: ISCAR, LTD., Tefen (IL)

(72) Inventor: Gil Hecht, Nahariya (IL)

(73) Assignee: Iscar, Ltd., Tefen (IL)

( * ) Notice: Subject to any disclaimer, the term of this patent is extended or adjusted under 35 U.S.C. 154(b) by 467 days.

(21) Appl. No.: 18/500,501

(22) Filed: Nov. 2, 2023

(65) Prior Publication Data

US 2025/0144717 A1 May 8, 2025

(51) Int. Cl.
B23B 27/16 (2006.01)
B23B 27/04 (2006.01)
B23B 27/14 (2006.01)

(52) U.S. Cl.
CPC .......... B23B 27/1611 (2013.01); B23B 27/04 (2013.01); B23B 27/141 (2013.01); B23B 27/1622 (2013.01); B23B 2200/0461 (2013.01); B23B 2200/125 (2013.01)

(58) Field of Classification Search
CPC ........ B23B 27/1611; B23B 2200/0461; B23B 2200/0414; B23B 2200/125; B23B 27/04; B23B 2205/12; B23B 27/1677; B23B 2200/048; B23B 2260/082; B23B 27/141; B23B 27/1662; B23B 27/162
See application file for complete search history.

(56) References Cited

U.S. PATENT DOCUMENTS

| 4,443,136 A | * | 4/1984 | Kemmer | ................ | B23D 61/06 |
| | | | | | 407/50 |
| 5,308,197 A | * | 5/1994 | Little | ........................ | B23G 5/18 |
| | | | | | 407/103 |
| 7,300,232 B2 | | 11/2007 | Wiman et al. | | |

(Continued)

FOREIGN PATENT DOCUMENTS

| DE | 102011007076 A1 | * | 10/2012 | ............. | B23B 27/08 |
| DE | 102014006054 A1 | * | 10/2015 | ........... | B23B 27/045 |

(Continued)

OTHER PUBLICATIONS

International Search Report and Written Opinion issued Feb. 20, 2025, in PCT/IL2024/051038.

*Primary Examiner* — Sara Addisu
(74) *Attorney, Agent, or Firm* — Womble Bond Dickinson (US) LLP

(57) ABSTRACT

A cutting tool has an indexable cutting insert removably secured to a holding portion of an insert holder. The cutting insert has opposing first and second end surfaces with an insert peripheral surface and a central axis extending therebetween, at least two cutting portions, and at least one mounting cut-out. Each cutting portion has a cutting edge formed by the intersection of rake and relief surfaces formed on the insert peripheral surface, one rake surface facing in a first rotary direction about the central axis and one rake surface facing in an opposite second rotary direction. Each mounting cut-out extends between the first and second end surfaces and has spaced apart first and second flank surfaces disposed on a cut-out peripheral surface which is separate and spaced apart from the insert peripheral surface. The first and second flank surfaces face in the first and second rotary directions, respectively.

25 Claims, 5 Drawing Sheets

(56) References Cited

U.S. PATENT DOCUMENTS

| | | | | |
|---|---|---|---|---|
| 8,678,718 | B2 | 3/2014 | Hecht | |
| 8,708,613 | B2 * | 4/2014 | Hecht | B23B 27/04 407/103 |
| 9,421,622 | B2 | 8/2016 | Segev et al. | |
| 9,457,409 | B2 | 10/2016 | Zeeb et al. | |
| 9,457,413 | B2 * | 10/2016 | Matsumoto | B23C 5/202 |
| 2009/0162154 | A1 * | 6/2009 | Jonsson | B23B 29/043 407/113 |
| 2012/0099935 | A1 * | 4/2012 | Hecht | B23B 27/1614 407/103 |
| 2013/0330138 | A1 * | 12/2013 | Saito | B23B 27/045 407/114 |
| 2013/0336733 | A1 * | 12/2013 | Hecht | B23B 27/065 407/56 |
| 2015/0290717 | A1 * | 10/2015 | Hecht | B23B 29/043 407/103 |
| 2017/0341152 | A1 * | 11/2017 | Ida | B23B 27/1622 |
| 2019/0084053 | A1 * | 3/2019 | Vöge | B23B 27/04 |
| 2019/0091772 | A1 * | 3/2019 | Sagara | B23B 27/1611 |
| 2022/0134444 | A1 * | 5/2022 | Schmidt | B23B 27/04 407/30 |
| 2022/0212269 | A1 | 7/2022 | Miyazawa | |
| 2022/0219243 | A1 * | 7/2022 | Kato | B23B 27/16 |
| 2022/0219245 | A1 * | 7/2022 | Kato | B23B 27/1677 |
| 2022/0347761 | A1 | 11/2022 | Kondou et al. | |
| 2023/0121524 | A1 * | 4/2023 | Hecht | B23B 27/04 407/66 |
| 2024/0123516 | A1 * | 4/2024 | Hecht | B23B 27/04 |
| 2025/0144715 | A1 * | 5/2025 | Athad | B23B 27/04 |

FOREIGN PATENT DOCUMENTS

| | | | | |
|---|---|---|---|---|
| WO | WO-2015137508 A1 * | 9/2015 | ......... | B23B 27/1622 |
| WO | WO-2016186113 A1 * | 11/2016 | ............. | B23B 27/04 |

* cited by examiner

CUTTING TOOL AND INDEXABLE CUTTING INSERT HAVING A MOUNTING CUT-OUT THEREFOR

FIELD OF THE INVENTION

The present invention relates to metal cutting tools for use in groove turning operations having an indexable cutting insert with a mounting cut-out.

BACKGROUND OF THE INVENTION

Within the field of metal cutting tools used in groove turning operations, cutting inserts removably securable in an insert holder have long since provided a way of performing a cutting operation with a suitably hard material, e.g., cemented carbide, in the vicinity of the cutting edge, where the insert holder, manufactured from a less hard material, e.g., tool steel, is reusable following the disposal of a worn or damaged cutting insert.

This type of cutting tool has been further developed to provide a more efficient means of securing the indexable insert to the insert holder. This type of cutting tool has also been developed to utilize indexable cutting inserts with an increased number of cutting edges, giving economic benefits from providing an increased number of cutting operations per cutting insert.

U.S. Pat. No. 8,678,718 B2 discloses a cutting tool having an indexable cutting insert with four cutting portions, the cutting insert securable within a holder portion in four index positions by means of a fastener. The cutting insert has two opposing end surfaces with a peripheral side surface and a central axis extending therebetween, the peripheral side surface having exactly four abutment zones. The insert holder has a holder portion and a body portion, the holder portion having a sidewall surface with a first, second and third reaction zone. The cutting insert is divided into four imaginary quadrants about its central axis and the four abutment zones are located entirely in two of the four imaginary quadrants, and for each index position, three of the four abutment zones are in clamping contact with the three reaction zones.

U.S. Pat. No. 9,457,409 B2 discloses an indexable cutting insert with a plate-like main body having two parallel main surfaces and a peripheral surface connecting the two main surfaces and with a plurality of sections angled with respect to one another, wherein four cutting edges that extend transversely to the main surfaces are provided on the peripheral surface at the transition to sections, that are angled with respect to one another, of the peripheral surface, and wherein the position of the cutting edges defines a quadrilateral in the plan view of the main surfaces. Fixing with more favorable leverages and permanently more precise positioning of the cutting edges are provided by the quadrilateral having in each case two short and two long sides and cutting edges oriented in each case in opposite directions in the peripheral direction at adjacent corners and oriented in each case in the same direction at diagonally opposite corners of the quadrilateral.

U.S. Pat. No. 9,421,615 B2 discloses a cutting tool having an indexable cutting insert with exactly four cutting portions, the cutting insert removably securable to an insert holder by a fastener. The cutting insert has two opposing end surfaces with a peripheral side surface extending therebetween, and each cutting portion has a major cutting edge formed by the intersection of a rake surface and a relief surface. The peripheral side surface has first and second pairs of opposing side surfaces which include the four relief surfaces and the four rake surfaces, respectively. In an end view, four cutting points on the four major cutting edges define the transitions between the first and second pairs of opposing side surfaces, and a minimum first length dimension between the second pair of opposing side surfaces is less than six-tenths of a minimum second length dimension between two of the four cutting points.

It is an object of the present invention to provide an improved indexable cutting insert which can be economically manufactured with a high level of manufacturing efficiency.

It is also an object of the present invention to provide an improved indexable cutting insert having a high level of strength and rigidity and robustly supported cutting edges.

It is a further object of the present invention to provide an improved indexable cutting insert which enables efficient chip forming and a reduced risk of inadvertent chip collision during chip evacuation.

It is yet a further object of the present invention to provide an improved cutting tool which can perform internal groove turning operations.

It is still yet a further object of the present invention to provide an improved cutting tool in which the cutting insert can be removably secured to an insert holder in an efficient manner.

SUMMARY OF THE INVENTION

In accordance with one aspect of the present invention, there is provided an indexable cutting insert comprising opposing first and second end surfaces with an insert peripheral surface and a central axis extending therebetween, at least two cutting portions, and at least one mounting cut-out, each cutting portion having a cutting edge formed by the intersection of a rake surface and a relief surface, the at least two rake surfaces and the at least two relief surfaces formed on the insert peripheral surface, at least one of the at least two rake surfaces facing in a first rotary direction about the central axis and at least one of the at least two rake surfaces facing in a second rotary direction about the central axis opposite to the first rotary direction, and each cutting edge having a radially outermost cutting point, and in an end view of the cutting insert, the at least two radially outermost cutting points define a first imaginary circle having a first diameter and a center coincident with the central axis, and each of the at least one mounting cut-out extending between and intersecting the first and second end surfaces and having spaced apart first and second flank surfaces, the first and second flank surfaces of each of the at least one mounting cut-out being disposed on a cut-out peripheral surface, each cut-out peripheral surface being separate and spaced apart from the insert peripheral surface, and the first flank surface of each of the at least one mounting cut-out facing in the first rotary direction and the second flank surface of each of the at least one mounting cut-out facing in the second rotary direction, wherein, in an end view of the cutting insert:

a first plane containing the central axis traverses at least one of the at least one mounting cut-out and intersects the insert peripheral surface at first and second peripheral points, and the first and second peripheral points are located on opposite sides of a second plane perpendicular to the first plane and containing the central axis.

In accordance with another aspect of the invention, there is provided a cutting tool comprising an insert holder and a cutting insert of the sort described above retained therein, the insert holder having a holding portion extending along a longitudinal tool axis, the holding portion having a front end surface transverse to the longitudinal tool axis and a seating surface disposed on the front end surface, and the cutting insert is removably securable to the holding portion in any one of at least two index positions, wherein, in each index position of the cutting insert:

exactly one cutting portion is operative, and one of the first and second end surfaces is in clamping contact with the seating surface.

BRIEF DESCRIPTION OF THE DRAWINGS

For a better understanding, the invention will now be described, by way of example only, with reference to the accompanying drawings in which chain-dash lines represent cut-off boundaries for partial views of a member and in which.

DETAILED DESCRIPTION OF THE INVENTION

Figures 1, 2:
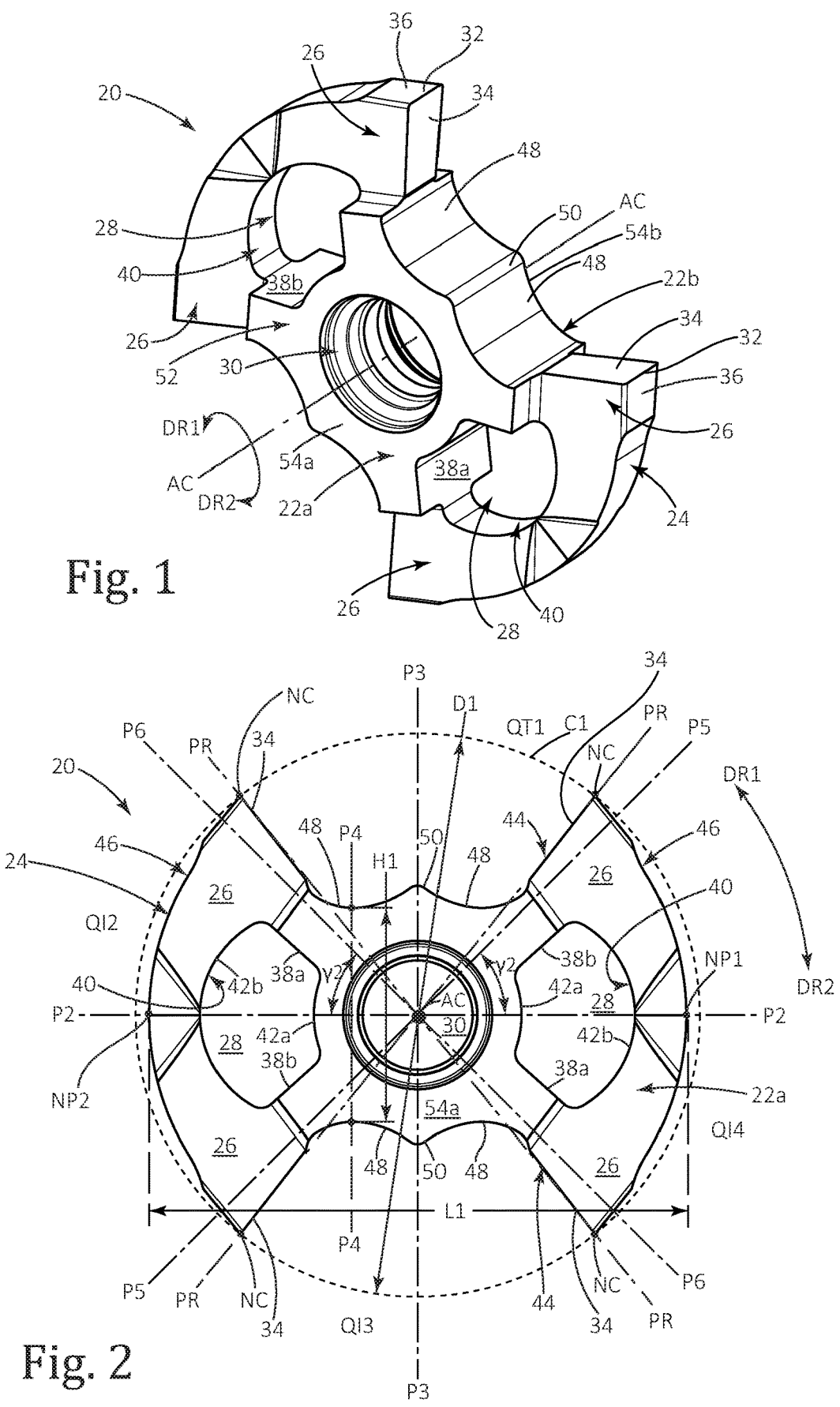
FIG. 1 is a perspective view of a cutting insert in accordance with some embodiments of the present invention.
FIG. 2 is an end view of the cutting insert shown in FIG. 1.

Attention is first drawn to FIGS. 1 to 6, showing an indexable cutting insert 20 which may be manufactured by form pressing and sintering a cemented carbide, such as tungsten carbide, and may be coated or uncoated.

The indexable cutting insert 20 has opposing first and second end surfaces 22a, 22b with an insert peripheral surface 24 and a central axis AC extending therebetween, at least two cutting portions 26, and at least one mounting cut-out 28.

In some embodiments of the present invention, the insert peripheral surface 24 may be continuous, defining a circumferential boundary of the first and second end surfaces 22a, 22b.

Also, in some embodiments of the present invention, a through bore 30 may extend coaxially with the central axis AC and intersect the first and second end surfaces 22a, 22b.

Each of the at least two cutting portions 26 has a cutting edge 32 formed by the intersection of a rake surface 34 and a relief surface 36, and the at least two rake surfaces 34 and the at least two relief surfaces 36 are formed on the insert peripheral surface 24.

The cutting insert 20 may be suitable for use in groove turning operations.

Figure 5:
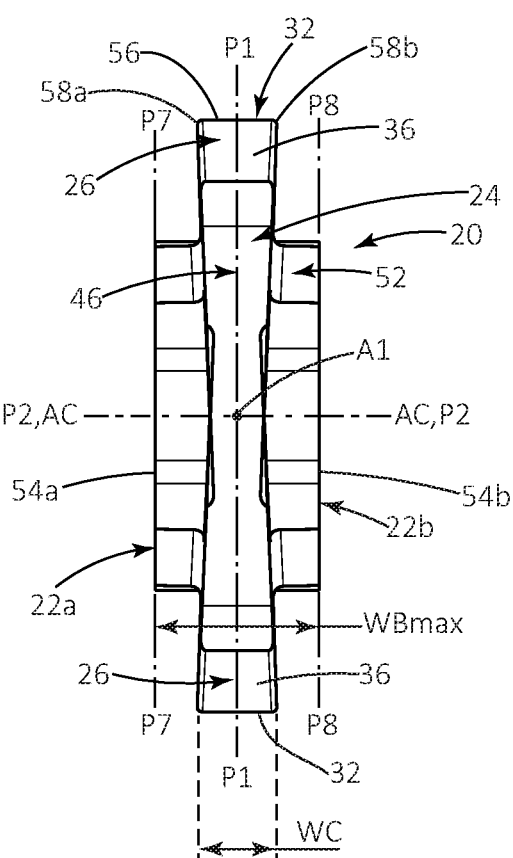
FIG. 5 is a side view of the cutting insert shown in FIG. 1.
Figure 6:
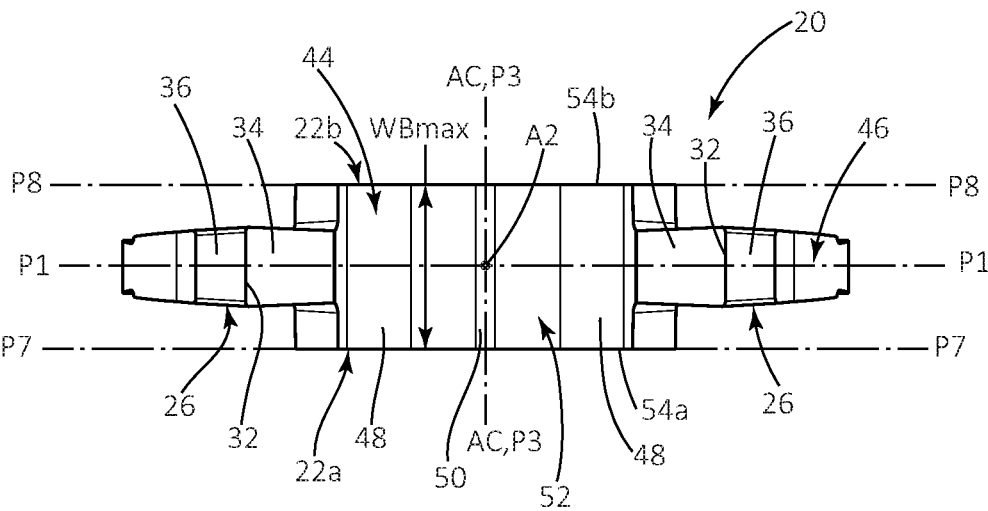
FIG. 6 is a top view of the cutting insert shown in FIG. 1.

As shown in FIGS. 5 and 6, a first plane P1 perpendicular to central axis AC is located midway between the first and second end surfaces 22a, 22b.

In some embodiments of the present invention, the first plane P1 may intersect each of the at least two cutting edges 32.

As shown in FIG. 2, at least one of the at least two rake surfaces 34 faces in a first rotary direction DR1 about the central axis AC and at least one of the at least two rake surfaces 34 faces in a second rotary direction DR2 about the central axis AC opposite to the first rotary direction DR1.

Each of the at least two cutting edges 32 has a radially outermost cutting point NC, and in an end view of the cutting insert 20, as shown in FIG. 2, the at least two radially outermost cutting points NC define a first imaginary circle C1 having a first diameter D1 and a center coincident with the central axis AC.

In some embodiments of the present invention, in an end view of the cutting insert 20, as shown in FIG. 2, no portion of the cutting insert 20 may traverse the first imaginary circle C1 or be located outside the first imaginary circle C1.

Each of the at least one mounting cut-out 28 extends between and intersects the first and second end surfaces 22a, 22b and has spaced apart first and second flank surfaces 38a, 38b.

By configuring the cutting insert 20 with at least one mounting cut-out 28 extending between and intersecting the first and second end surfaces 22a, 22b, the cutting insert 20 has a reduced volume and may be economically manufactured from a reduced amount of cemented carbide.

In some embodiments of the present invention, the first plane P1 may intersect the first and second flank surfaces 38a, 38b of each of the at least one mounting cut-out 28.

As shown in FIG. 2, the first flank surface 38a of each of the at least one mounting cut-out 28 faces in the first rotary direction DR1 and the second flank surface 38a of each of the at least one mounting cut-out 28 faces in the second rotary direction DR2.

In an end view of the cutting insert 20, as shown in FIG. 2, a second plane P2 containing the central axis AC traverses at least one of the at least one mounting cut-out 28 and intersects the insert peripheral surface 24 at first and second peripheral points NP1, NP2.

In some embodiments of the present invention, the first and second flank surfaces 38a, 38b of at least one of the at least one mounting cut-out 28 may be entirely located on opposite sides of the second plane P2.

As shown in FIG. 2, the first and second peripheral points NP1, NP2 are located on opposite sides of a third plane P3 perpendicular to the second plane P2 and containing the central axis AC.

In some embodiments of the present invention, the first and second peripheral points NP1, NP2 may be equidistant from the third plane P3.

As shown in FIG. 2, the first and second peripheral points NP1, NP2 define a first insert length L1 along the second plane P2.

In some embodiments of the present invention, the first insert length L1 may be greater than eighty-five percent of the first diameter D1, i.e., L1>0.85*D1.

Figure 3:
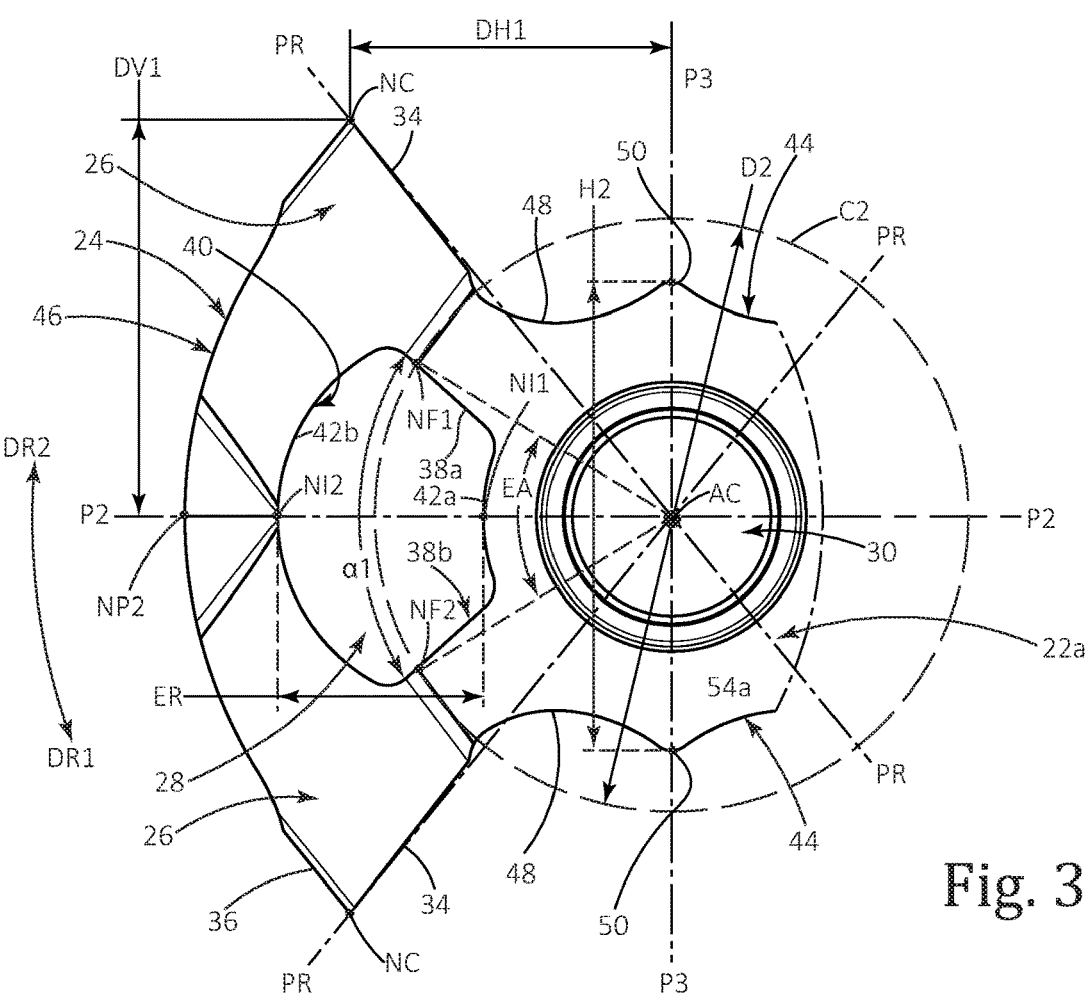
FIG. 3 is a first detailed view of the cutting insert shown in FIG. 2.

As shown in FIGS. 2 and 3, the first and second flank surfaces 38a, 38b of each of the at least one mounting cut-out 28 are disposed on a cut-out peripheral surface 40, and each cut-out peripheral surface 40 is separate and spaced apart from the insert peripheral surface 24.

In some embodiments of the present invention, each of the at least one cut-out peripheral surface 40 may be continuous, defining a circumferential boundary of the associated mounting cut-out 28. For such embodiments of the present invention, each of the at least one mounting cut-out 28 may be described as a 'closed' mounting cut-out 28.

For embodiments of the present invention in which each of the at least one mounting cut-out 28 is a 'closed' mounting cut-out 28, it should be appreciated that the cutting insert 20 has an advantageously high level of strength and rigidity.

In some embodiments of the present invention, the first plane P1 may intersect the entire circumferential extent of the cut-out peripheral surface 40 of each of the at least one mounting cut-out 28.

As shown in FIGS. 2 and 3, the first and second flank surfaces 38a, 38b of each of the at least one mounting cut-out 28 may be spaced apart by first and second intermediate surfaces 42a, 42b. For such embodiments of the present invention, it should be appreciated that the first and second intermediate surfaces 42a, 42b may be disposed on the cut-out peripheral surface 40 of the associated mounting cut-out 28, whereby the first and second flank surfaces 38a, 38b and the first and second intermediate surfaces 42a, 42b may be alternately arranged along the cut-out peripheral surface 40.

In some embodiments of the present invention, the second intermediate surface 42b may be located radially further from the central axis AC than the first intermediate surface 42a.

Also, in some embodiments of the present invention, the first intermediate surface 42a may have a convex shape, and the second intermediate surface 42b may have a concave shape.

Further, in some embodiments of the present invention, the first intermediate surface 42a may be convexly curved, and the second intermediate surface 42b may be concavely curved.

As shown in FIG. 3, the second plane P2 may intersect the first and second intermediate surfaces 42a, 42b of at least one of the at least one mounting cut-out 28 at first and second intermediate points NI1, NI2, respectively, and the first and second intermediate points NI1, NI2 may define a cut-out radial extent ER along the second plane P2.

In some embodiments of the present invention, the cut-out radial extent ER may be greater than ten percent of the first diameter D1, i.e., ER>0.10*D1.

Also, in some embodiments of the present invention, the cut-out radial extent ER may be less than thirty percent of the first diameter D1, i.e., ER<0.30*D1.

As shown in FIGS. 2 and 3, the first and second flank surfaces 38a, 38b of each of the at least one mounting cut-out 28 may diverge away from each other with increased distance from the central axis AC.

In some embodiments of the present invention, the first and second flank surfaces 38a, 38b of each of the at least one mounting cut-out 28 may be planar.

As shown in FIG. 3, the first and second flank surfaces 38a, 38b of each of the at least one mounting cut-out 28 may form an external mounting angle α1.

It should be appreciated that use of the term "external angle" throughout the description and claims refers to an angle between two surface components as measured external to the member on which these surface components are formed.

In some embodiments of the present invention, the mounting angle α1 may have a range from forty degrees to one hundred and twenty degrees, i.e., 40°≤α1≤120°.

Also, in some embodiments of the present invention, the mounting angle α1 may preferably have a range from sixty degrees to one hundred degrees, i.e., 60°≤α1≤100°.

As shown in FIG. 3, a second imaginary circle C2 having a second diameter D2 and a center coincident with the central axis AC may intersect the first and second flank surfaces 38a, 38b of each of the at least one mounting cut-out 28 at first and second flank points NF1, NF2, respectively.

In some embodiments of the present invention, the second diameter D2 may be greater than fifty percent of the first diameter D1, i.e., D2>0.50*D1.

Also, in some embodiments of the present invention, the second diameter D2 may be less than seventy percent of the first diameter D1, i.e., D2<0.70*D1.

Further, in some embodiments of the present invention, the first and second peripheral points NP1, NP2 may be located outside the second imaginary circle C2.

As shown in FIG. 3, the first and second flank points NF1, NF2 of each of the at least one mounting cut-out 28 define a cut-out angular extent EA. It should be appreciated that the cut-out angular extent EA of each of the at least one mounting cut-out 28 is measured along an arc portion of the second imaginary circle C2.

In some embodiments of the present invention, the cut-out angular extent EA of each of the at least one mounting cut-out 28 may be greater than thirty degrees, i.e., EA>30°.

Also, in some embodiments of the present invention, the cut-out angular extent EA of each of the at least one mounting cut-out 28 may be preferably greater than forty-five degrees, i.e., EA>45°.

As shown in FIG. 2, exactly two mounting cut-outs 28 may extend between and intersect the first and second end surfaces 22a, 22b.

For embodiments of the present invention having exactly two mounting cut-outs 28, it should be appreciated that the cutting insert 20 has a total of four flank surfaces, namely, two pairs of first and second flank surfaces 38a, 38b.

In some embodiments of the present invention, the two mounting cut-outs 28 may be located on opposite sides of the third plane P3.

Also, in some embodiments of the present invention, the second plane P2 may traverse both mounting cut-outs 28.

Further, in some embodiments of the present invention, the first and second flank surfaces 38a, 38b of both mounting cut-outs 28 may be entirely located on opposite sides of the second plane P2.

Yet further, in some embodiments of the present invention, the second plane P2 may intersect the first and second intermediate surfaces 42a, 42b of both mounting cut-outs 28.

Yet still further, in some embodiments of the present invention, the two mounting cut-outs 28 may be identical to each other.

As shown in FIG. 2, the cutting insert 20 may exhibit mirror symmetry about the third plane P3.

Also, as shown in FIGS. 1 and 2, the cutting insert 20 may have exactly four cutting portions 26, comprising four cutting edges 32 formed by the intersection of four rake surfaces 34 and four relief surfaces 36.

In some embodiments of the present invention, two of the four rake surfaces 34 may face in the first rotary direction DR1 and the other two of the four rake surfaces 34 may face in the second rotary direction DR2.

For embodiments of the present invention having exactly four cutting portions 26, the insert peripheral surface 24 may have first pairs of opposing side surfaces 44 and second pairs of opposing side surfaces 46.

As shown in FIG. 2, the side surfaces 44 of first pair of opposing side surfaces 44 may be located on opposite sides of the second plane P2, and the side surfaces 46 of the second pair of opposing side surfaces 46 may be located on opposite sides of the third plane P3.

Also, as shown in FIG. 2, in an end view of the cutting insert 20, the four radially outermost cutting points NC of the four cutting edges 32 may define the transitions between the first and second pairs of opposing side surfaces 44, 46.

In some embodiments of the present invention, the first pair of opposing side surfaces 44 may include the four rake surfaces 34 and the second pair of opposing side surfaces 46 may include the four relief surfaces 36.

Also, in some embodiments of the present invention, the first and second peripheral points NP1, NP2 may be located on the second pair of opposing side surfaces 46.

As shown in FIGS. 2 and 3, each cutting portion 26 has a radial plane PR containing the central axis AC and its associated radially outermost cutting point NC.

In some embodiments of the present invention, each rake surface 34 may face towards or lie on its associated radial plane PR.

For embodiments of the present invention in which each rake surface 34 faces towards or lies on its associated radial plane PR, the cutting insert 20 may be suitable for use in internal groove turning operations.

As shown in FIGS. 1 to 3, the first pair of opposing side surfaces 44 may have a chip evacuation surface 48 adjacent each rake surface 34.

In some embodiments of the present invention, each radial plane PR may intersect the chip evacuation surface 48 adjacent its associated rake surface 34. For such embodiments of the present invention, it should be appreciated that the first pair of opposing side surfaces 44 advantageously provide sufficient space adjacent each rake surface 34 to enable efficient chip forming.

As shown in FIGS. 2 and 3, in an end view of the cutting insert 20, each chip evacuation surface 48 may be concavely curved.

In some embodiments of the present invention, the first pair of opposing side surfaces 44 may include four chip evacuation surfaces 48.

Figure 4:
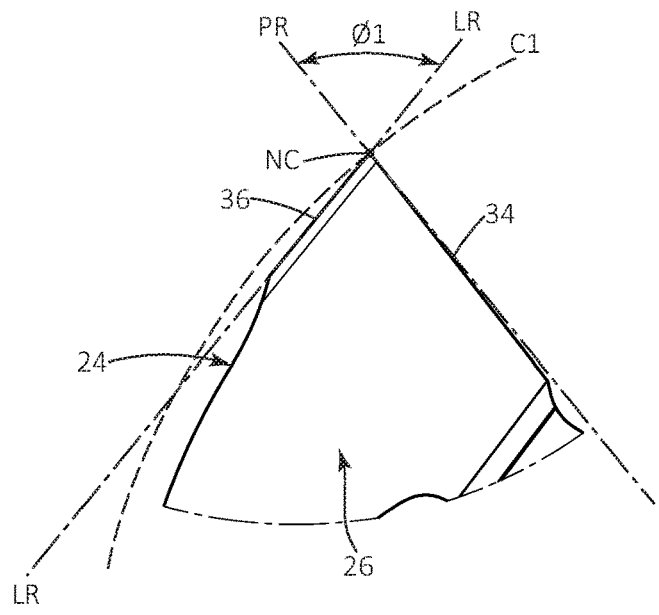
FIG. 4 is a second detailed view of the cutting insert shown in FIG. 2.

As shown in FIG. 4, each radial plane PR forms an acute relief angle φ1 with a straight imaginary relief line LR coincident with or tangential to the relief surface 36 immediately adjacent its associated radially outermost cutting point NC.

In some embodiments of the present invention, the acute relief angle φ1 may have a value equal to or greater than seventy degrees, i.e., $\phi1 \geq 70°$.

Configuring each cutting portion 26 to have a relief angle φ1 equal to or greater than seventy degrees advantageously provides robust support for the associated cutting edge 32 during internal groove turning operations.

As shown in FIG. 2, a first insert height H1 is measured between the first pair of opposing side surfaces 44 perpendicular to the second plane P2.

In some embodiments of the present invention, the first insert height H1 may be less than fifty percent of the first diameter D1, i.e., H1<0.50*D1.

Also, in some embodiments of the present invention, the first insert height H1 may be greater than thirty percent of the first diameter D1, i.e., H1>0.30*D1.

Further, in some embodiments of the present invention, as shown in FIG. 2, the first insert height H1 may be measured in a fourth plane P4 parallel to and offset from the third plane P3.

Further, in some embodiments of the present invention, the first insert height H1 may define a minimum insert height between the first pair of opposing side surfaces 44.

Yet further, in some embodiments of the present invention, the first insert height H1 may be measured between two chip evacuation surfaces 48 located on opposite sides of the second plane P2.

As shown in FIGS. 2 and 6, the first pair of opposing side surfaces 44 may include a pair of side ridges 50 located on opposite sides of the second plane P2 extending transversely with respect to the first plane P1.

In some embodiments of the present invention, the third plane P3 may longitudinally bisect the pair of side ridges 50, and a second insert height H2 may be measured between the pair of side ridges 50 along the third plane P3.

Also, in some embodiments of the present invention, the second insert height H2 may be greater than the first insert height H1.

Further, in some embodiments of the present invention, two chip evacuation surfaces 48 located on the same side of the second plane P2 may be spaced apart by one of the side ridges 50. For such embodiments of the present invention, it should be appreciated that during a groove turning operation in which a single cutting portion 26 is operative, cutting chips flowing away from the operative cutting portion 26 along one of the two chip evacuation surfaces 48 will be deflected by the ridge 50, thus reducing the risk of the cutting chips inadvertently colliding with and damaging the non-operative cutting portion 26 located on the same side of the second plane P2.

In an end view of the cutting insert 20, as shown in FIG. 2, each chip evacuation surface 48 may be concavely curved.

As shown in FIG. 2, the cutting insert 20 may exhibit mirror symmetry about the second plane P2.

Also, as shown in FIG. 2, the cutting insert 20 is divided into four imaginary insert quadrants QI1, QI2, QI3, QI4 by mutually perpendicular fifth and sixth planes P5, P6 containing the central axis AC.

In some embodiments of the present invention, the first pair of opposing side surfaces 44 may be entirely located in opposite first and third imaginary insert quadrants QI1, QI3 of the four imaginary insert quadrants QI1, QI2, QI3, QI4. For such embodiments of the present invention, it should be appreciated that two of the four cutting edges 32 and their associated rake surfaces 34 may be located in the first imaginary insert quadrant QI1 and the other two of the four cutting edges 32 and their associated rake surfaces 34 may be located in the third imaginary insert quadrant QI3.

As shown in FIG. 2, the fifth plane P5 forms an acute first inclination angle λ1 with the second plane P2, and the sixth plane P6 forms an acute second inclination angle λ2 with the second plane P2.

In some embodiments of the present invention, the first and second inclination angles λ1, λ2 may be equal, having a value of 45 degrees, i.e., λ1=45° and λ2=45°.

As shown in FIG. 3, each radially outermost cutting point NC is located a first vertical distance DV1 from the second plane P2 and a first horizontal distance DH1 from the third plane P3.

In some embodiments of the present invention, the first vertical distance DV1 may be greater than thirty percent of the first diameter D1, i.e., DV1>0.30*D1.

Also, in some embodiments of the present invention, the first horizontal distance DH1 may be less than the first vertical distance DV1, i.e., DH1<DV1.

As shown in FIG. 2, the two mounting cut-outs 28 may be entirely located in opposite second and fourth imaginary insert quadrants QI2, QI4 of the four imaginary insert quadrants QI1, QI2, QI3, QI4.

In some embodiments of the present invention, the cutting insert 20 may exhibit 2-fold rotational symmetry about the central axis AC.

For embodiments of the present invention in which the cutting insert 20 exhibits 2-fold rotational symmetry about the central axis AC, the first flank surfaces 38*a* of the two mounting cut-outs 28 may be parallel to each other, and the second flank surfaces 38*b* of the two mounting cut-outs 28 may be parallel to each other.

As shown in FIGS. 1 and 2, the through bore 30 may extend through a central body portion 52 of the cutting insert 20 and open out to first and second central sub-surfaces 54*a*, 54*b* of the first and second end surfaces 22*a*, 22*b*, respectively.

In some embodiments of the present invention, the first and second central sub-surfaces 54*a*, 54*b* may be planar.

Also, in some embodiments of the present invention, as shown in FIGS. 5 and 6, the first and second central sub-surfaces 54*a*, 54*b* may define seventh and eighth planes P7, P8 perpendicular to the central axis AC.

Further, in some embodiments of the present invention, the first intermediate surface 42*a* of each mounting cut-out 28 may be formed on the central body portion 52, extending between the first and second central sub-surfaces 54*a*, 54*b*.

As shown in FIGS. 5 and 6, in a direction parallel to the central axis AC, each cutting portion 26 has a cutting width WC defined by its cutting edge 32, and the central body portion 52 has a maximum body width WB$_{MAX}$ defined by the first and second central sub-surfaces 54*a*, 54*b*.

In some embodiments of the present invention, the maximum body width WB$_{MAX}$ may be greater than the cutting width WC of each cutting portion 26.

As shown in FIGS. 5 and 6, each cutting portion 26 may be entirely located between the seventh and eighth planes P7, P8.

For embodiments of the present invention in which the four cutting portions 26 are entirely located between the seventh and eighth planes P7, P8, no portion of the cutting insert 20 may be located further from the first plane P1 than the first and second central sub-surfaces 54*a*, 54*b* located on either side thereof, thus enabling the first and second central sub-surfaces 54*a*, 54*b* to be efficiently ground to a high degree of accuracy.

Also, for embodiments of the present invention in which the four cutting portions 26 are entirely located between the seventh and eighth planes P7, P8, the cutting widths WC of the four cutting portions 26 may be advantageously modified to achieve multiple product variants without modifying the first and second central sub-surfaces 54*a*, 54*b*.

In some embodiments of the present invention, the cutting width WC of each cutting portion 26 may be less than thirty percent of the first diameter D1, i.e., WC<0.30*D1.

Also, in some embodiments of the present invention, each cutting edge 32 may have a rectilinear main cutting edge-portion 56 extending between two curved corner cutting edge-portions 58*a*, 58*b*.

Further, in some embodiments of the present invention, each main cutting edge-portion 56 may traverse the first plane P1 and be perpendicular thereto.

For embodiments of the present invention in which each cutting edge's main cutting edge-portion 56 is perpendicular to the first plane P1, it should be appreciated that the cutting edge's radially outermost cutting point NC is any point along the main cutting edge-portion 56.

As shown in FIGS. 5 and 6, the cutting insert 20 may exhibit mirror symmetry about the first plane P1.

In some embodiments of the present invention, the cutting insert 20 may exhibit 2-fold rotational symmetry about a first axis A1 formed at the intersection of the first and second planes P1, P2.

Also, in some embodiments of the present invention, the cutting insert 20 may exhibit 2-fold rotational symmetry about a second axis A2 formed at the intersection of the first and third planes P1, P3.

Attention is now drawn to FIGS. 7 to 10, showing a cutting tool 60 according to the present invention, comprising an insert holder 62 and the cutting insert 20 retained therein.

The insert holder 62 has a holding portion 64 extending along a longitudinal tool axis AL, and the cutting insert 20 is removably securable to the holding portion 64 in any one of at least two index positions.

Figures 9, 10:
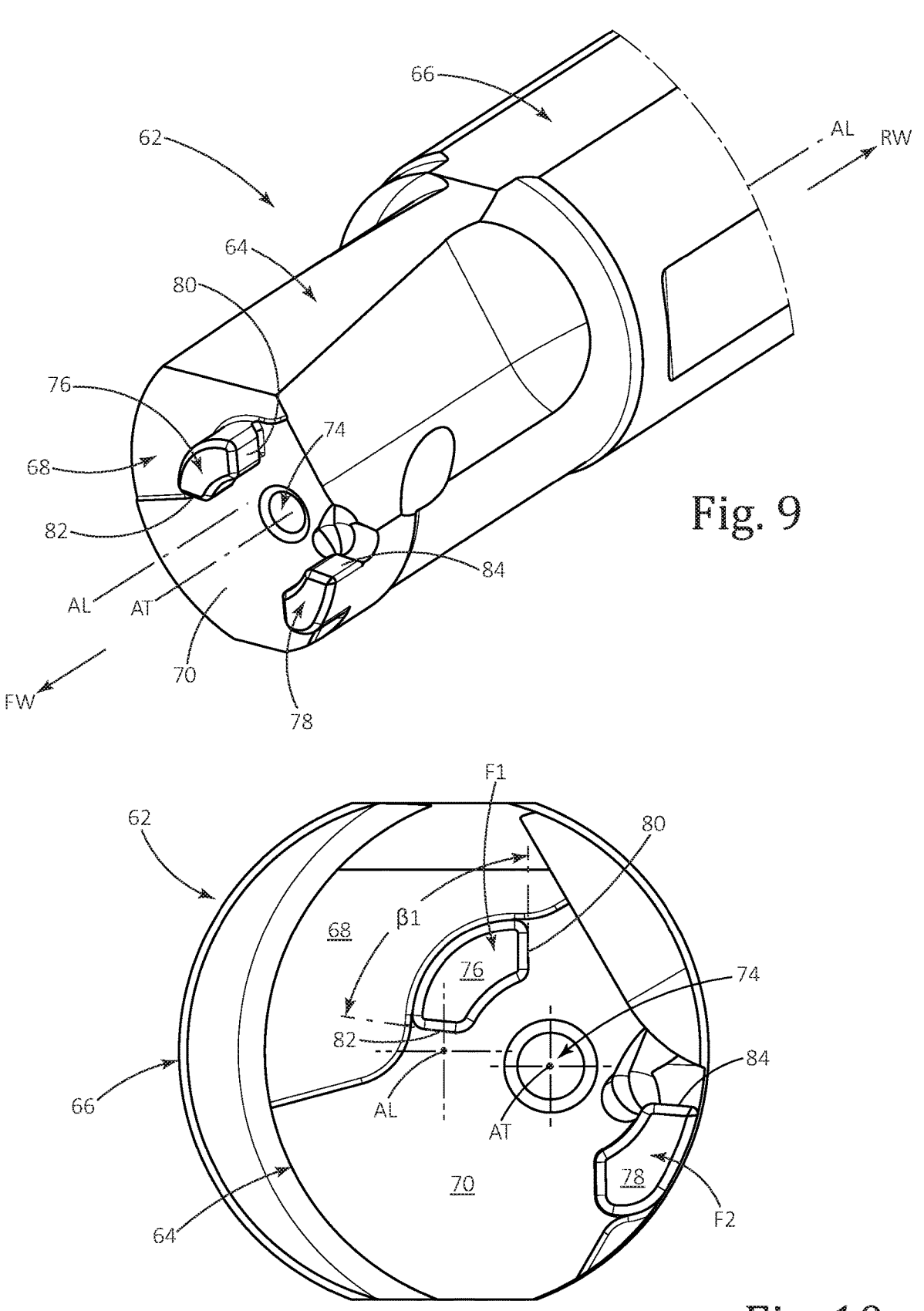
FIG. 9 is a perspective view of the insert holder in accordance with some embodiments of the present invention.
FIG. 10 is an end view of the insert holder shown in FIG. 9.

In some embodiments of the present invention, as shown in FIG. 9, the longitudinal tool axis AL may define a forward-to-rearward direction FW, RW.

Also, in some embodiments of the present invention, the insert holder 62 may have a shank portion 66 extending away from the holding portion 64 in the rearward direction RW.

Further, in some embodiments of the present invention, the shank portion 66 may be substantially cylindrical.

In each index position of the cutting insert 20, exactly one cutting portion 26 is operative.

Figure 7:
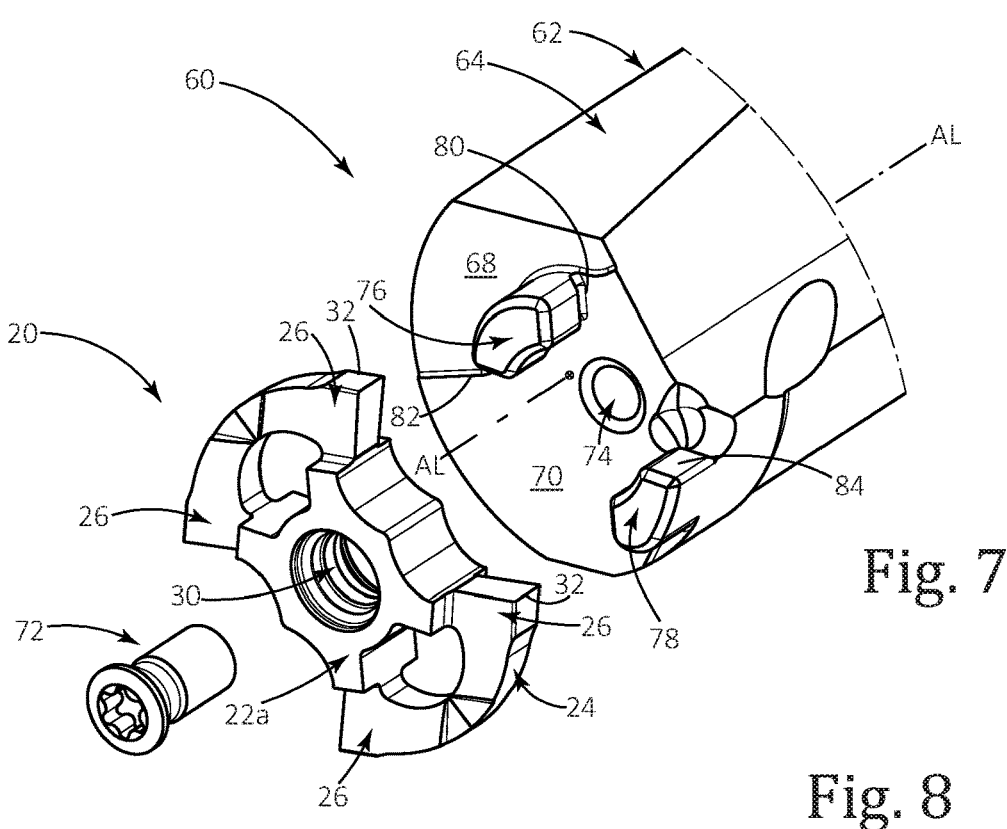
FIG. 7 is an exploded perspective view of a cutting tool in accordance with some embodiments of the present invention.
Figure 8:
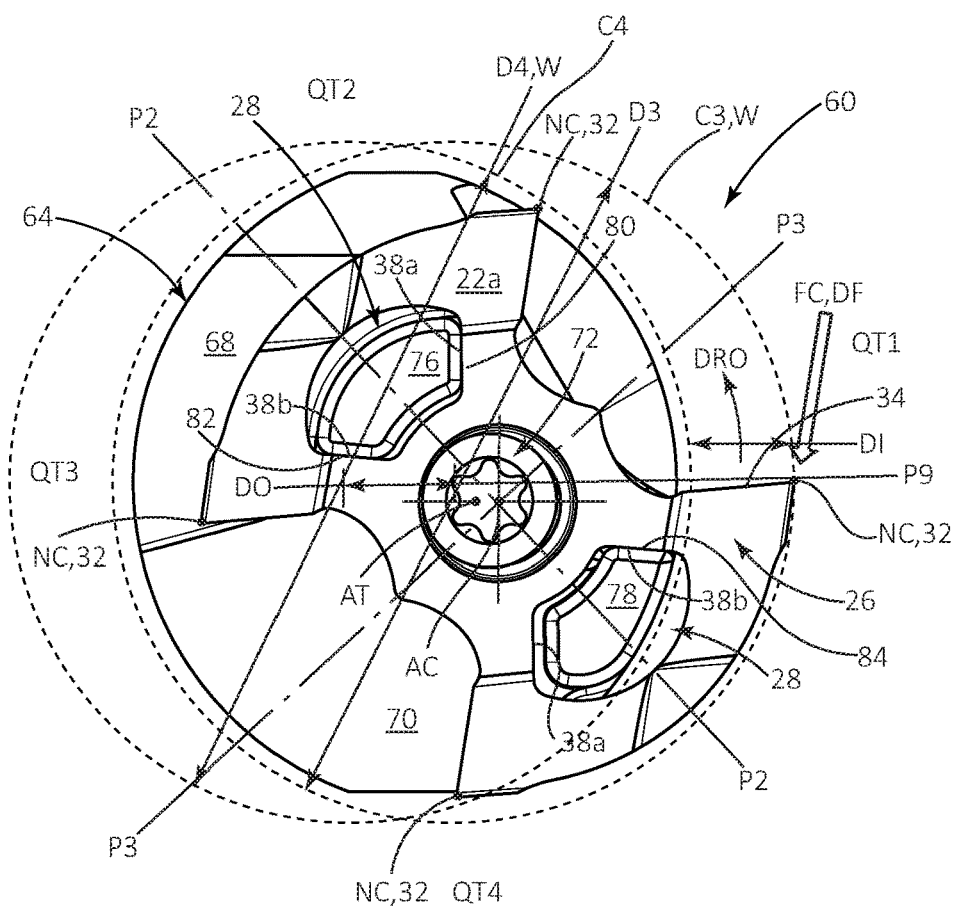
FIG. 8 is an end view of the cutting tool shown in FIG. 7, with a shank portion of an insert holder removed.

As shown in FIGS. 7 and 8, the holding portion 64 may have a front end surface 68 transverse to the longitudinal tool axis AL and a seating surface 70 disposed on the front end surface 68, and in each index position of the cutting insert 20, one of the first and second end surfaces 22*a*, 22*b* may be in clamping contact with the seating surface 70.

In some embodiments of the present invention, one of the first and second central sub-surfaces 54*a*, 54*b* may be in clamping contact with the seating surface 70.

Also, in some embodiments of the present invention, a clamping screw 72 may extend through the cutting insert's through bore 30 and engage a threaded bore 74 in the seating surface 70.

Further, in some embodiments of the present invention, the front end surface 68 may face in the forward direction FW.

Yet further, in some embodiments of the present invention, the seating surface 70 may be planar and perpendicular to the longitudinal tool axis AL.

As shown in FIGS. 7 to 10, the front end surface 68 may have spaced apart first and second mounting protuberances 76, 78 protruding therefrom.

In some embodiments of the present invention, the insert holder 62 may be of unitary one-piece construction, and the first and second mounting protuberances 76, 78 may be integrally formed components thereof.

In an end view of the holding portion 64, as shown in FIG. 10, the periphery of the first mounting protuberance 76 defines a first footprint F1 on the front end surface 68, and the periphery of the second mounting protuberance 78 defines a second footprint F2 on front end surface 68.

In some embodiments of the present invention, the first and second footprints F1, F2 may be non-identical.

Also, in some embodiments of the present invention, the first footprint F1 may have a greater area than the second footprint F2.

For embodiments of the present invention in which the cutting insert 20 has exactly two mounting cut-outs 28 extending between and intersecting its first and second end surfaces 22a, 22b, in each index position of the cutting insert 20, the first mounting protuberance 76 may occupy one of the mounting cut-outs 28 and the second mounting protuberance 78 may occupy the other mounting cut-out 28.

For embodiments of the present invention in which the cutting insert 20 has exactly two cutting portions 26 and a single mounting cut-out 28 extending between and intersecting its first and second end surfaces 22a, 22b (not shown), in each index position of the cutting insert 20, the first mounting protuberance 76 may occupy the single mounting cut-out 28, and the second mounting protuberance 78 may be located adjacent the insert peripheral surface 24.

As shown in FIGS. 7 to 10, the first mounting protuberance 76 may include spaced apart first and second reaction surfaces 80, 82 transverse to the seating surface 70, and the second mounting protuberance 78 may include a third reaction surface 84 transverse to the seating surface 70.

In some embodiments of the present invention, in each index position of the cutting insert 20, the first and second reaction surfaces 80, 82 may make abutting contact with the first and second flank surfaces 38a, 38b of the mounting cut-out 28 which the first mounting protuberance 76 occupies, and the third reaction surface 84 may make abutting contact with one of the first and second flank surfaces 38a, 38b of the mounting cut-out 28 which the second mounting protuberance 78 occupies.

Also, in some embodiments of the present invention, the first and second reaction surfaces 80, 82 may be planar.

As shown in FIG. 10, the first and second reaction surfaces 80, 82 may form an internal reaction angle β1.

It should be appreciated that use of the term "internal angle" throughout the description and claims refers to an angle between two surface components as measured internal to the member on which these surface components are formed.

In some embodiments of the present invention, the reaction angle β1 may have a range from forty degrees to one hundred and twenty degrees, i.e., $40° \leq β1 \leq 120°$.

Also, in some embodiments of the present invention, the reaction angle β1 may preferably have a range from sixty degrees to one hundred degrees, i.e., $60° \leq β1 \leq 100°$.

Further, in some embodiments of the present invention, the reaction angle β1 may be equal to the mounting angle α1.

Yet further, in some embodiments of the present invention, in each index position of the cutting insert 20, no portion of the first pair of opposing side surfaces 44 may make abutting contact with the holding portion 64. For such embodiments of the present invention, in which the first pair of opposing side surfaces 44 includes two pairs of chip evacuation surfaces 48, the chip evacuation surfaces 48 may be optimally configured without additional constraints of the first pair of opposing side surfaces 44 also providing a means of abutment.

For embodiments of the present invention in which the cutting insert 20 has exactly two mounting cut-outs 28 extending between and intersecting its first and second end surfaces 22a, 22b, in each index position of the cutting insert 20, no portion of the entire insert peripheral surface 24 may make abutting contact with the holding portion 64.

For embodiments of the present invention in which the cutting insert 20 has exactly two cutting portions 26 and a single mounting cut-out 28 extending between and intersecting its first and second end surfaces 22a, 22b (not shown), in each index position of the cutting insert 20, the first and second reaction surfaces 80, 82 may make abutting contact with the first and second flank surfaces 38a, 38b of the single mounting cut-out 28, and a portion of the insert peripheral surface 24 may make abutting contact with the second mounting protuberance's third reaction surface 84.

For embodiments of the present invention in which the cutting insert 20 has exactly four cutting portions 26, the cutting insert 20 may be removably securable to the holding portion 64 in any one of four index positions.

It should be appreciated that the cutting insert 20 may be indexed between different index positions by rotating the cutting insert 20 one hundred and eighty degrees around one of the central axis AC, the first axis A1, and the second axis A2.

For embodiments of the present invention in which a total of four flank surfaces, namely, two pairs of first and second flank surfaces 38a, 38b, are employed to make abutting contact with the first, second, and third reaction surfaces 80, 82, 84 in the four index positions, it should be appreciated that the cutting insert 20 is advantageously configured with a low numerical abutment ratio RA equal to 1.0, measured by dividing the total number of flank (abutment) surfaces by the number of index positions, which is beneficial with respect to manufacturing efficiency.

As shown in FIG. 8, in an end view of the cutting tool 60, a third imaginary circle C3 having a third diameter D3 contains the entire cutting insert 20 and the entire holding portion 64, and a fourth imaginary circle C4 having a fourth diameter D4 contains exactly three of the four cutting edges 32 and the entire holding portion 64.

Also, as shown in FIG. 8, the fourth diameter D4 is equal to the third diameter D3.

In some embodiments of the present invention, an offset distance DO between the centers of the third and fourth imaginary circles C3, C4 may be equal to or greater than ten percent of the third diameter D3, i.e., $DO \geq 0.10 * D3$.

Also, in some embodiments of the present invention, the first diameter D1 may be greater than seventy-five percent of the third diameter D3, i.e., $D1 > 0.75 * D3$.

Further, in some embodiments of the present invention, in an end view of the cutting tool 60, the third imaginary circle C3 may not contain the shank portion 66.

As shown in FIG. 8, in an end view of the cutting tool 60, the centers of the third and fourth imaginary circles C3, C4 are contained in a ninth plane P9 parallel to the longitudinal tool axis AL.

In some embodiments of the present invention, the radially outermost cutting point NC of the operative cutting portion's cutting edge 32 may be coincident with the ninth plane P9.

Also, in some embodiments of the present invention, the operative cutting portion 26 may have a depth of insertion DI perpendicular to the longitudinal tool axis AL, and the depth of insertion DI may be equal to the offset distance DO. For such embodiments of the present invention, it should be appreciated that the depth of insertion DI represents the maximum cutting depth in a workpiece W.

As shown in FIG. 8, the third imaginary circle C3 may represent a bore in the workpiece W prior to engagement of the operative cutting portion 26 therewith, and the fourth imaginary circle C4 may represent the bore in the workpiece W during an internal grooving operation at the maximum cutting depth of the operative cutting portion 26.

Configuring the cutting tool 60 such that the depth of insertion DI is equal to or greater than ten percent of the third diameter D3 advantageously enables the cutting tool 60 to perform internal groove turning operations at cutting depths equal to or greater than one-tenth of the bore diameter of the workpiece W within which the holding portion 64 extends.

For embodiments of the present invention having the threaded bore 74 in the seating surface 70, the threaded bore 74 may have a thread axis AT perpendicular to the seating surface 70, and in each index position of the cutting insert 20, as shown in FIG. 8, the insert's central axis AC may be parallel to and offset from the thread axis AT. For such embodiments of the present invention, it should be appreciated that the insert's through bore 30 is eccentric in relation to the threaded bore 74.

As shown in FIG. 8, in an end view of the cutting tool 60, the second and third planes P2, P3 define four imaginary tool quadrants QT1, QT2, QT3, QT4.

In some embodiments of the present invention, the third reaction surface 84 and the thread axis AT may be located in opposite first and third imaginary tool quadrants QT1, QT3, respectively, of the four imaginary tool quadrants QT1, QT2, QT3, QT4.

For embodiments of the present invention in which the third reaction surface 84 and the thread axis AT are located in the opposite first and third imaginary tool quadrants QT1, QT3 respectively, tightening of the clamping screw 72 within the threaded bore 74 urges the first and second flank surfaces 38a, 38b, of the mounting cut-out 28 which the first mounting protuberance 76 occupies, towards the first mounting protuberance's first and second reaction surfaces 80, 82 to make abutting contact therewith, whilst additionally promoting rotation of the cutting insert 20 about its central axis AC, so that one of the first and second flank surfaces 38a, 38b of the mounting cut-out 28, which the second mounting protuberance 78 occupies, makes abutting contact with the second mounting protuberance's third reaction surface 84.

As shown in FIG. 8, in an end view of the cutting tool 60, the rake surface 34 of the operative cutting portion 26 faces in an operative rake direction DRO about the central axis AC.

It should be appreciated that a cutting force FC applied to the operative cutting portion 26 when the cutting insert 20 engages the workpiece W is in a force direction DF about the central axis AC opposite to the operative rake direction DRO.

In some embodiments of the present invention, the third reaction surface 84 may face in the operative rake direction DRO.

Also, in some embodiments of the present invention, both the third reaction surface 84 and the operative cutting portion 26 may be located in the first imaginary tool quadrant QT1 of the four imaginary tool quadrants QT1, QT2, QT3, QT4.

Although the present invention has been described to a certain degree of particularity, it should be understood that various alterations and modifications could be made without departing from the spirit or scope of the invention as hereinafter claimed.

What is claimed is:

1. An indexable cutting insert (20) comprising opposing first and second end surfaces (22a, 22b) with an insert peripheral surface (24) and a central axis (AC) extending therebetween, at least two cutting portions (26), and at least one mounting cut-out (28), each cutting portion (26) having a cutting edge (32) formed by the intersection of a rake surface (34) and a relief surface (36), the at least two rake surfaces (34) and the at least two relief surfaces (36) formed on the insert peripheral surface (24), at least one of the at least two rake surfaces (34) facing in a first rotary direction (DR1) about the central axis (AC) and at least one of the at least two rake surfaces (34) facing in a second rotary direction (DR2) about the central axis (AC) opposite to the first rotary direction (DR1), and each cutting edge (32) having a radially outermost cutting point (NC), and in an end view of the cutting insert (20), the at least two radially outermost cutting points (NC) define a first imaginary circle (C1) having a first diameter (D1) and a center coincident with the central axis (AC), and each of the at least one mounting cut-out (28) extending between and intersecting the first and second end surfaces (22a, 22b) and having spaced apart first and second flank surfaces (38a, 38b), the first and second flank surfaces (38a, 38b) of each of the at least one mounting cut-out (28) being disposed on a cut-out peripheral surface (40), each cut-out peripheral surface (40) being separate and spaced apart from the insert peripheral surface (24), and the first flank surface (38a) of each of the at least one mounting cut-out (28) facing in the first rotary direction (DR1) and the second flank surface (38a) of each of the at least one mounting cut-out (28) facing in the second rotary direction (DR2), wherein, in an end view of the cutting insert (20):

a second plane (P2) containing the central axis (AC) traverses at least one of the at least one mounting cut-out (28) and intersects the insert peripheral surface (24) at first and second peripheral points (NP1, NP2), and the first and second peripheral points (NP1, NP2) are located on opposite sides of a third plane (P3) perpendicular to the second plane (P2) and containing the central axis (AC).

2. The indexable cutting insert (20) according to claim 1, wherein:

the first and second peripheral points (NP1, NP2) define a first insert length (L1) along the second plane (P2), and the first insert length (L1) is greater than eighty-five percent of the first diameter (D1).

3. The indexable cutting insert (20) according to claim 1, wherein:

the first and second flank surfaces (38a, 38b) of at least one of the at least one mounting cut-out (28) are entirely located on opposite sides of the second plane (P2).

4. The indexable cutting insert (20) according to claim 1, wherein:

exactly two mounting cut-outs (28) extend between and intersect the first and second end surfaces (22a, 22b), and the second plane (P2) traverses both mounting cut-outs (28).

5. The indexable cutting insert (20) according to claim 4, wherein:

the cutting insert (20) has exactly four cutting portions (26) comprising four cutting edges (32) formed by the intersection of four rake surfaces (34) and four relief surfaces (36).

6. The indexable cutting insert (20) according to claim 5, wherein:

the insert peripheral surface (24) has first and second pairs of opposing side surfaces (44, 46), the first pair of opposing side surfaces (44) including the four rake surfaces (34) and the second pair of opposing side surfaces (46) including the four relief surfaces (36).

7. The indexable cutting insert (20) according to claim 6, wherein:

the first and second peripheral points (NP1, NP2) are located on the second pair of opposing side surfaces (46).

8. The indexable cutting insert (20) according to claim 6, wherein, in an end view of the cutting insert (20):

a first insert height (H1) is measured between the first pair of opposing side surfaces (44) perpendicular to the second plane (P2), and the first insert height (H1) is less than fifty percent of the first diameter (D1).

9. The indexable cutting insert (20) according to claim 6, wherein:

the cutting insert (20) is divided into four imaginary insert quadrants (QI1, QI2, QI3, QI4) by mutually perpendicular seventh and eighth planes (P7, P8) containing the central axis (AC), and the first pair of opposing side surfaces (44) are entirely located in opposite first and third imaginary insert quadrants (QI1, QI3) of the four imaginary insert quadrants (QI1, QI2, QI3, QI4).

10. The indexable cutting insert (20) according to claim 9, wherein:

the seventh plane (P7) forms an acute first inclination angle ($\lambda$1) with the second plane (P2), the eighth plane (P8) forms an acute second inclination angle ($\lambda$2) with the second plane (P2), and the first and second inclination angles ($\lambda$1, $\lambda$2) are equal, having a value of 45 degrees.

11. The indexable cutting insert (20) according to claim 1, wherein:

the first and second flank surfaces (38a, 38b) of each of the at least one mounting cut-out (28) are spaced apart by first and second intermediate surfaces (42a, 42b), and the second intermediate surface (42b) is located radially further from the central axis (AC) than the first intermediate surface (42a).

12. The indexable cutting insert (20) according to claim 11, wherein, in an end view of the cutting insert (20):

the second plane (P2) intersects the first and second intermediate surfaces (42a, 42b) of at least one of the at least one mounting cut-out (28) at first and second intermediate points (NI1, NI2), respectively, the first and second intermediate points (NI1, NI2) define a cut-out radial extent (ER) along the second plane (P2), and the cut-out radial extent (ER) is greater than ten percent of the first diameter (D1).

13. The indexable cutting insert (20) according to claim 1, wherein, in an end view of the cutting insert (20):

a second imaginary circle (C2) having a second diameter (D2) and a center coincident with the central axis (AC) intersects the first and second flank surfaces (38a, 38b) of each of the at least one mounting cut-out (28) at first and second flank points (NF1, NF2), respectively.

14. The indexable cutting insert (20) according to claim 13, wherein:

the first and second flank points (NF1, NF2) of each of the at least one mounting cut-out (28) define a cut-out angular extent (EA), and the cut-out angular extent (EA) of each of the at least one mounting cut-out (28) is greater than thirty degrees.

15. The indexable cutting insert (20) according to claim 1, wherein:

a through bore (30) extends coaxially with the central axis (AC) and intersects the first and second end surfaces (22a, 22b).

16. The indexable cutting insert (20) according to claim 15, wherein:

the through bore (30) extends through a central body portion (52) of the cutting insert (20) and opens out to first and second central sub-surfaces (54a, 54b) of the first and second end surfaces (22a, 22b), respectively.

17. The indexable cutting insert (20) according to claim 16, wherein in a direction parallel to the central axis (AC):

each cutting portion (26) has a cutting width (WC) defined by its cutting edge (32), the central body portion (52) has a maximum body width ($WB_{MAX}$) defined by the first and second central sub-surfaces (54a, 54b), and the maximum body width ($WB_{MAX}$) is greater than the cutting width (WC) of each cutting portion (26).

18. The indexable cutting insert (20) according to claim 1, wherein:

a first plane (P1) perpendicular to the central axis (AC) is located midway between the first and second end surfaces (22a, 22b), and the first plane (P1) intersects each of the at least two cutting edges (32).

19. The indexable cutting insert (20) according to claim 18, wherein:

the first plane (P1) intersects the first and second flank surfaces (38a, 38b) of each of the at least one mounting cut-out (28).

20. A cutting tool (60) comprising an insert holder (62) and a cutting insert (20) in accordance with claim 1 retained therein, the insert holder (62) having a holding portion (64) extending along a longitudinal tool axis (AL), the holding portion (64) having a front end surface (68) transverse to the longitudinal tool axis (AL) and a seating surface (70) disposed on the front end surface (68), and the cutting insert (20) is removably securable to the holding portion (64) in any one of at least two index positions, wherein, in each index position of the cutting insert (20):

exactly one cutting portion (26) is operative, and one of the first and second end surfaces (22a, 22b) is in clamping contact with the seating surface (70).

21. The cutting tool (60) according to claim 20, wherein:

spaced apart first and second mounting protuberances (76, 78) protrude from the front end surface (68), exactly two mounting cut-outs (28) extend between and intersect the first and second end surfaces (22*a*, 22*b*), and in each index position of the cutting insert (20), the first mounting protuberance (76) occupies one of the mounting cut-outs (28) and the second mounting protuberance (78) occupies the other mounting cut-out (28).

22. The cutting tool (60) according to claim 21, wherein:

the first mounting protuberance (76) includes spaced apart first and second reaction surfaces (80, 82) transverse to the seating surface (70), the second mounting protuberance (78) includes a third reaction surface (84) transverse to the seating surface (70), and wherein, in each index position of the cutting insert (20):

the first and second reaction surfaces (80, 82) make abutting contact with the first and second flank surfaces (38*a*, 38*b*) of the mounting cut-out (28) which the first mounting protuberance (76) occupies, and the third reaction surface (84) makes abutting contact with one of the first and second flank surfaces (38*a*, 38*b*) of the mounting cut-out (28) which the second mounting protuberance (78) occupies.

23. The cutting tool (60) according to claim 21, wherein:

the cutting insert (20) has exactly four cutting portions (26), and the cutting insert (20) is removably securable to the holding portion (64) in any one of four index positions.

24. The cutting tool (60) according to claim 23, wherein in an end view of the cutting tool (60):

a third imaginary circle (C3) having a third diameter (D3) contains the entire cutting insert (20) and the entire holding portion (64), a fourth imaginary circle (C4) having a fourth diameter (D4) contains exactly three of the four cutting edges (32) and the entire holding portion (64), the fourth diameter (D4) is equal to the third diameter (D3), and an offset distance (DO) between the centers of the third and fourth imaginary circles (C3, C4) is equal to or greater than ten percent of the third diameter (D3).

25. The cutting tool (60) according to claim 24, wherein:

the first diameter (D1) is greater than seventy-five percent of the third diameter (D3).

* * * * *